Figure 1:
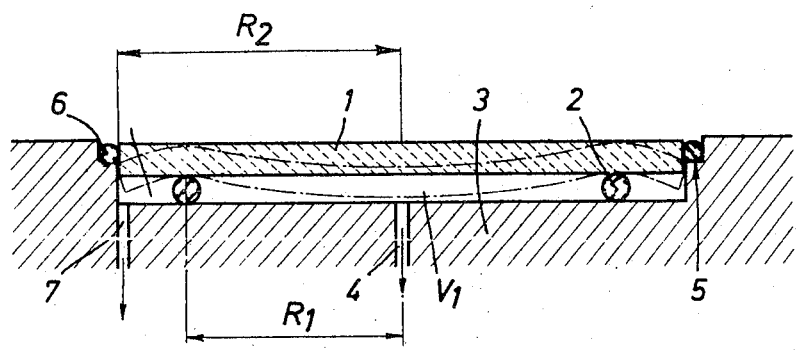

United States Patent
Lemaitre

[15] 3,693,301
[45] Sept. 26, 1972

[54] METHOD FOR PRODUCING OPTICAL ELEMENTS WITH ASPHERICAL SURFACES

[72] Inventor: Gérard Lemaitre, Marseille, France

[73] Assignee: Etablissment Public: Agence Nationale de Valorisation de la Recherche (Anvar) Tour Aurore, Paris, France

[22] Filed: Jan. 19, 1971

[21] Appl. No.: 107,680

[30] Foreign Application Priority Data

May 27, 1970    France.......................7019261

[52] U.S. Cl. ........................51/235, 51/284, 51/324, 350/178
[51] Int. Cl. .............................................B24b 47/00
[58] Field of Search .........350/178; 51/235, 284, 324

[56] References Cited

UNITED STATES PATENTS

| 873,340 | 12/1907 | Bagnall | 51/235 |
| 2,444,531 | 7/1948 | Richardson | 51/235 |
| 2,127,181 | 8/1938 | Mattern | 51/235 |

OTHER PUBLICATIONS

"Making Corrector Plates by Schmidt's Vacuum Method" Applied Optics, May 1966, Vol. 5, No. 5, pp. 713– 715

*Primary Examiner*—Harold D. Whitehead
*Attorney*—Melville, Strasser, Foster & Hoffmann

[57] ABSTRACT

A method for producing optical elements with aspherical surfaces with a pneumatic device for deforming the plates to be formed into optical elements. The plates are deformed by reducing the pressure in a central chamber independently of the reduction of pressure in one or more concentric annular chambers. Toroidal sealing members are provided between the chambers and serve as supports for the plate to be deformed. The invention is particularly useful in optical instruments for astronomy.

8 Claims, 2 Drawing Figures

PATENTED SEP 26 1972  3,693,301

GÉRARD LEMAITRE

MELVILLE, STRASSER, FOSTER and HOFFMAN
attorneys

METHOD FOR PRODUCING OPTICAL ELEMENTS WITH ASPHERICAL SURFACES

This invention relates to a method of producing aspherical optical surfaces or diopters and more particularly to a method of producing an optical plate for compensating aberrations in the spherical mirrors of telescopes and eye glasses or other optical instruments.

There are already various methods for producing compensating optical plate in particular according to the method of Bernard Schmidt in which the optical plate is curved by reducing the pneumatic pressure acting on one of the faces of the optical plate.

According to this method a planar optical element is centered on a circular cavity having an outer radius smaller than that of the lens, the connection between the cavity and the optical element being airtight, and a vacuum is then created in the cavity. The force exerted by the atmospheric pressure thus deforms the optical element whereas the vacuum maintains the optical element deformed and the face of the optical element subjected to the vacuum is then polished with convex tools whose curvature is suitably chosen.

This known method has various disadvantages.

One of the most important disadvantages resides in the fact that the Schmidt method requires for a particular useful diameter of the optical element a change of radius of curvature of the surfacing tools for each different optical element.

Another disadvantage of the said method is that it requires a certain amount of final retouching with surfacing tools having a diameter much smaller than the diameter of the surface of revolution being finished. Since the retouching is inevitably localized, a surface waviness is effected which causes a straying or diffusion of light and an alteration of the diffraction spot.

Further, when it is desired to provide optical elements with a Kerber profile by means of the Schmidt method, it is necessary to turn the optical elements over to have them undergo a second annular concentric deformation with respect to the first and then finish this second surface.

It therefore follows from the above that the production of such optical elements necessitates a series of long, delicate and imprecise and therefore costly steps which do not enable the achievement of the desired quality.

The present invention has for an object a method of producing aspherical refractive surfaces of the Schmidt and Schmidt-Kerber types which obviate the aforesaid disadvantages.

The method according to the invention is a considerable simplification of the manufacture of compensating or corrective optical elements for telescopes, eye glasses and other optical instruments while using the same mounting of the optical elements and the same surfacing tools, which are preferably planar, irrespective of the number of optical elements to be worked; and carrying out this deformation by at least two pneumatic pressure-reducing or vacuum means.

The manufacture of the compensating or corrective optical elements is therefore much more rapid and their surfacing more accurate.

The method according to the invention consists in working the entire surface of the lens (planar or spherical) in the customary manner by means of tools, preferably planar or possibly spherical, having the same diameter as that of the optical element whereas the optical element undergoes a static deformation in a pneumatic apparatus, the said method being characterized in that the said apparatus comprises a circular central chamber and at least one annular chamber concentric with the circular chamber adapted to be subjected to a vacuum, the said chambers being hermetically separated in order that they may be subjected to different degrees of vacuum, from each other, the separation between the chambers is assured by annular sealing members having diameters which correspond to the circular zones of support for the optical element which are not subject to any deformation but which have a revolution symmetry at the level of the support, and the optical element after surfacing and polishing one face being turned over in order to surface and polish the other face whereas the optical element is deformed by vacuum, the relationship between the radius, the weight and the thickness can be different for each of the faces of the optical element.

The rigidity of the plate carrying the chamber is chosen as a function of the optical element to be worked.

Different profiles or shapes can be given to an optical element in using polishing tools with appropriate curvatures for each face of the optical element.

Figure 2:
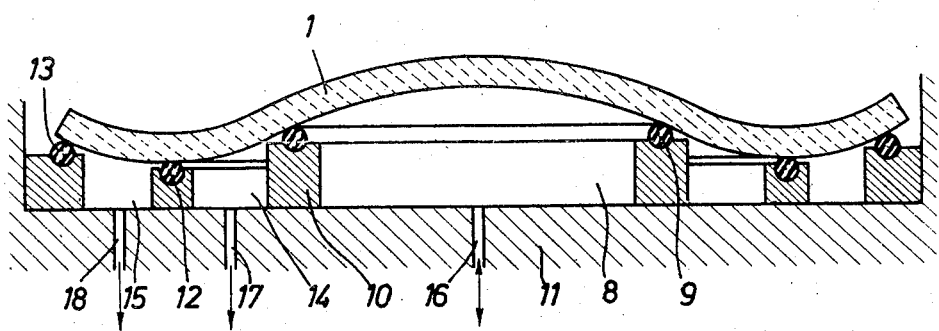

The invention will be described in greater detail hereinbelow with reference to the accompanying drawings wherein:

FIG. 1 is a schematic showing of the principle of the method according to the invention; and FIG. 2 is a schematic showing of the principle according to a variation of this method.

Owing to a choice of pressures and diameters, the surfacing is more convenient and more economical because there is no need to retouch the surface obtained by static deformation as it is of the same quality as a spherical or planar surface which has not been deformed.

The circular optical plate is placed on a circular sealing support member having a smaller diameter than that of the optical plate fixed on the upper wall of a vessel which can be put under a vacuum or at atmospheric conditions. The optical plate bends at its central portion when a vacuum is created in the space between the optical plate and the bottom having an aperture at its center.

According to the invention, the optical plate 1 (FIG. 1) placed on an airtight circular support 2 resting on a base plate 3, can be placed under a vacuum at its central portion as well as at its periphery.

Accordingly, the base plate 3 is formed with a recess into the bottom of which extends a channel 4 communicating with a conduit which can be connected to a vacuum. The side wall of the recess includes a circular shoulder 5 which can be eliminated if it is desired to flatten the sealing support member 2 by surfacing and on which is placed an annular seal 6 in which is gripped the optical plate 1. Beyond the sealing support member 2 a channel 7 extends into the bottom of the recess and can be in communication with a vacuum conduit independent of that connected to the channel 4 in the base plate.

The apparatus with the optical plate 1 thus forms a central chamber $V_1$ limited by the circular sealing member 2 and an annular chamber $V_2$ delimited by the same sealing member and by the vertical side wall of the recess. The fluidtightness of this chamber is assured by the annular sealing member 6.

It is understood that in creating the vacuum in the two chambers $V_1$ and $V_2$ the optical plate 1 supported on the sealing member 2 deforms as shown in the phantom lines in FIG. 1 following the Kerber profile.

The method of course should take into account the parameters $R_1$ of radius of the sealing support member and the radius $R_2$ of the optical plate if it is going to be suitable for the particular optical element to be formed.

The degree of vacuum created in each of the two chambers $V_1$ and $V_2$ can be different from each other and the channels 4 and 7 will therefore have to be connected to different conduits each controlled by its own valve.

The use of a second additional chamber while increasing the number of parameters enables:

1. the formation of a particular profile or shape of desired deformation by the calculator of the optical system;
2. the formation of an optimum useful diameter equal to the total diameter of the optical element.

For other applications a different deformation can be effected by changing various parameters (pressure, diameter of the circule etc.) in order to satisfy the conditions required by the calculator.

In every case it will be necessary to take into account the following conditions.

Accordingly for the purposes of explanation, the ambient pressure will be designated by $P_o$ which can be the atmospheric pressure or that of the pressurized enclosure.

In the zones situated between the plate 1 and the base plate 3 are maintained pressure $P_1$ in the zone within the perimeter of the support defined by the sealing member 2, and the pressure $P_2$ in the zone surrounding the perimeter of the support delimited by the sealing member 6.

The central portion of the optical plate is subjected to a force $P_o - P_1 = Q_1 P_o$ and the peripheral portion of the optical plate subjected to a force $P_o - P_2 = Q_2 P_o$.

Under these forces the refractive plate is elastically deformed and the bending of the central portion is a function of the radius to the fourth power.

It is clear that the coefficients of the function to the fourth power depend on the ratio $Q_2/Q_1$ of the pressures and the ratios $R_2/R_1$ of the radii defined hereinabove.

It is therefore proposed to use the values of the two parameters $Q_2/Q_1$ and $R_2/R_1$ (characterizing the geometric shape or profile of the deformations) and the thickness $h$ of the refractive plate (characterizing the magnitude of the deformations) in a manner that:

1. the elastic deformation is equal to the aberrations of the geometric optical system; and
2. the non-useful surface of the goemetric optical system is kept to a minimum.

In the case of Schmidt elements wherein the profile is a function of the radius to the fourth power, the calculation of the elasticity shows that there is a single infinite series of the three values ($Q_2/Q_1$, $R_2/R_1$, $h$) which give solutions. These solutions are equal to the Schmidt meridian line for the central portion delimited by or extending slightly beyond the radius $R_1$.

For a Schmidt-Kerber optical plate, a Kerber profile is given. This well known profile has no dimensions. With an optical plate of a given useful diameter, the size of the deformation is only connected from the viewing point of the plate to the openings in the optical plate, i.e. to the radius of curvature of the spherical mirror.

With regard to the elasticity the size of the deformation is only a function of the thickness of the optical plate and of the ambient pressure af it is worked in a pressurized atmosphere. These two considerations make it possible to go easily from the elasticity of the geometrical optical system when choosing the appropriate thickness corresponding to a given aperture number. If a plate of the same useful diameter but with a different aperture number are desired, the same mounting of the optical element, the same tools and the same vacuum as employed hereinabove are used.

This also holds for a profile other than the Kerber profile.

It should be noted that when the surfacing with two sources of vacuum is used, the median thickness can be slightly different than that given by the amplitude calculation but the profile is not affected to the extent that it remains a Kerber profile, but when the method using on source of vacuum is employed, the fact that the profile is no longer a Kerber profile can be very annoying.

Finally, the method employing two sources of vacuum enables the production of very deformed optical elements ($\omega \geq 1$) in contrast with the Schmidt method wherein the stresses are poorly dispersed and the refractive element break when $\omega < 2$.

According to the invention, the construction of aspherical optical elements of all other profiles can be effected by placing different points of support at precise locations thereby creating a central chamber and a plurality of annular chambers as shown in FIG. 2.

In this Figure, which is purely theoretical, a central chamber 8 is created under the refractive plate 1 by a toroidal sealing member 9 mounted on a ring 10 which is adjustably secured to the base plate 11.

The annular sealing members 12 and 13 can create themselves chambers 14 and 15 concentric with the central chamber 8.

The channels 16, 17 and 18 extending through the base plate 11 enables the creating of a vacuum of a different desired degree in each of the chambers.

It should be noted that the elasticity of the toroidal sealing members is taken advantage to take into account the hyperstatic conditions.

In all cases a customary final polishing of the profiled lenses is carried out.

By way of illustration and in no way deemed limiting an example of the manufacture of a refractive plate with a Schmidt meridian and a Kerber profile will now be given.

1. Geometric profile

In order to effect a Kerber profile, the ratios of $Q_2/Q_1$ and $R_2/R_1$ must be those in the ranges given in the following table:

$$1 \leq Q_2/Q_1 \leq 2:1 \leq R_2/R_1 \leq 2.5$$

| 2 | " | 3:1 | " | 2.0 |
| 3 | " | 4:1 | " | 1.8 |
| 4 | " | 5:1 | " | 1.7 |
| 5 | " | 6:1 | " | 1.6 |
| 6 | " | 7:1 | " | 1.6 |

The useful surface of the optical plate is given by $R_1$ or a radius slightly different.

2. Magnitude of the deformations

Assuming E is Young's modulus of the optical plate to be formed and the origin of the deformations is in the Kerber zone, $W_{max}$ is the deflection at the center of the refractive plate the thickness $h$ of the plate must be chosen according to the following equation:

$$h = \sqrt[3]{(P_0/E)(R^4/W_{max}) \cdot Y_{Kerber}(Q_2/Q_1)}$$

The function $Y_{Kerber}(Q_2/Q_1)$ is a value without dimension which is also an object of the present invention.

The values of this function are those indicated in the ranges of the following table:

| 1 | ≤ | $Q_2/Q_1$ | ≤ | 2:0.02 | ≤ | $Y_{Kerber}$ | ≤ 0.20 |
| 2 | | " | | 3:0.02 | | " | 0.14 |
| 3 | | " | | 4:0.02 | | " | 0.10 |
| 4 | | " | | 5:0.01 | | " | 0.07 |
| 5 | | " | | 6:0.01 | | " | 0.06 |
| 6 | | " | | 7:0.01 | | " | 0.05 |

By way of example it can be specified that a Schmidt-Kerber optical element produced according to the method of the invention and deformed on its two faces BSC B 16.64 has the following characteristics:

Useful diameter
$2_{R_1} = 245$ mm.
$2R_s = 295$ mm.
$Q_1 = 6$
$Q_2 = 1$
$P_a = 1$ atmosphere
$h = 4.10$ mm.

and the magnitude of the deformations correct the aberrations of the spherical mirror opened to $f/1.50$.

It does not seem possible that the Schmidt method with a single vacuum zone could have produced compensating or corrective optical element of this dimension.

The method according to the invention enables the economical manufacture of any mirror, lens or other optical element for correcting or compensating for all or part of the aberrations of an optical system such as a photographic lens system, cinemagraphic lens system, Gauss monochromatic lenses, telescopic lenses, lenses for spectrographic chambers, telephoto lenses, camera lenses or the like.

The method is of great interest in the optical industry in general and in particular for uses with regard to astronomy.

What we claim is:

1. A device for producing a circular aspherical optical element by pneumatic deformation of a planar circular optical plate, comprising:
    a. a circular chamber of a depth greater than the thickness of said plate;
    b. means for sealing the periphery of said plate against the circumference of said circular chamber;
    c. an annular sealing support for said plate, dividing said circular chamber into a central circular chamber and an annular chamber concentric with said central circular chamber, said support serving to seal said last named chambers from each other, and
    d. means for reducing the pressure in said central circular chamber and in said annular chamber independently of each other and to different degrees.

2. A device as claimed in claim 1, wherein the said annular sealing support is at least one toroidal sealing element.

3. A device as claimed in claim 2, wherein another toroidal sealing element is arranged about the periphery of the plate, the annular chamber therefore being delimited by the toroidal sealing elements.

4. A device as claimed in claim 2, wherein there are two annular chambers, and the means comprise toroidal sealing elements arranged at different distances from the median plane of the plate to be deformed.

5. A device as claimed in claim 1, wherein the annular sealing supports are supported on a base plate, and the stiffness of the base plate is a function of the stiffness of the plate to be deformed.

6. The method of producing a predetermined aspherical optical surface by pneumatic action on both sides of a planar or spherical optical element, which comprises working one entire surface of said element in the normal manner, while selectively deforming said element in a central and at least one annular area by vacuum, to different degrees, and after surfacing and polishing said one face of said element, turning said element over and working the entire other surface of said element in the normal way while again selectively deforming said element in a central and at least one annular area by vacuum to different degrees.

7. A method for producing aspherical optical elements comprising the steps of supporting a plate element to be deformed on at least one circular support, the portion within the support defining a first portion and the portion outside the support defining a second portion reducing the pressure over the first portion and the second portion independently of one another and to different degrees thereby deforming the plate, and then surfacing the deformed element on one face and then the other.

8. A method as claimed in claim 6, wherein the faces of the element are finished with polishing tools such that each face has a different profile.

* * * * *